United States Patent Office 3,725,294
Patented Apr. 3, 1973

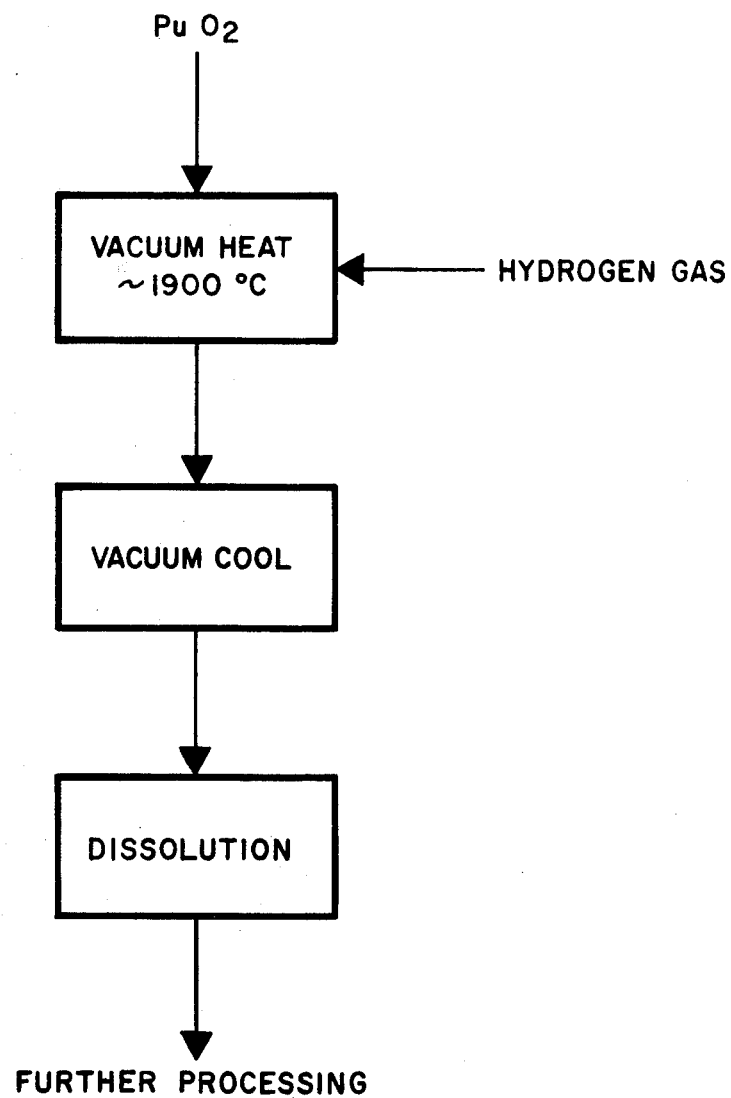

3,725,294
METHOD FOR DISSOLVING PLUTONIUM DIOXIDE
Ronald L. Deaton, Germantown, and Gary L. Silver, Centerville, Ohio, assignors to the United States of America as represented by the United States Atomic Energy Commission
Filed Jan. 27, 1972, Ser. No. 221,255
Int. Cl. C01g 56/00
U.S. Cl. 252—301.1 R          5 Claims

ABSTRACT OF THE DISCLOSURE

Method of dissolving refractory plutonium dioxide ($PuO_2$) by heating to convert plutonium dioxide to a lower oxide form, which is then dissolved in a suitable acid.

BACKGROUND OF INVENTION

Major problems encountered in manufacturing processes wherein the dissolution of plutonium dioxide is required, may include extensive time required for dissolution, damage to equipment by materials used, impure products, undesirable by-products, and/or the extremely corrosive dissolving agents which must be employed. The dissolution of refractory plutonium dioxide in acids such as phosphoric and hydrobromic is ordinarily a lengthy process requiring many hours or days, may involve extensive corrosion of process equipment, and frequently yields a plutonium solution containing undesirable ions. Dissolution processes using molten salts, such as potassium pyrosulfate, are hazardous, extensive and contaminate the plutonium with undesirable by-products. A widely used dissolution process involves boiling plutonium dioxide in a nitric-hydrofluoric acid mixture. Ths process not only involves the use of highly corrosive hydrofluoric acid but also leads to undesirable neutron emission levels when a refractory oxide of a highly radioactive isotope of plutonium, such as plutonium-238, is used.

SUMMARY OF INVENTION

In order to overcome the foregoing problems and drawbacks, it is an object of this invention to provide an improved, relatively simple, and faster method of dissolving plutonium dioxide.

It is an object of this invention to provide a method of dissolving $PuO_2$ which does not require the large proportions of extremely hazardous material, such as hydrofluoric acid, and the elevated temperature requirements for said corrosive mixtures in the dissolution of plutonium dioxide.

Various other objects and advantages will appear from the following description and its features. It is understood that persons skilled in the art may make various changes within the principles and scope of this invention as brought out in the appended claims.

The invention comprises heating plutonium dioxide under controlled temperature, pressure, and atmosphere conditions for a sufficient time until the conversion to a lower oxide, such as diplutonium trioxide, is generally effected, cooling under controlled conditions to prevent reoxidation, and dissolving the cooled product with a suitable acid or acid mixture.

DESCRIPTION OF DRAWING

The drawing illustrates a schematic of a preferred processing sequence of this invention.

DETAILED DESCRIPTION

As shown in the drawing, the initial material, which may be in any form such as grains, chunks, powder, etc., but which preferably is in comminuted form, such as a finely divided powder with particle size less than about $1000\mu$, is plutonium dioxide containing any appropriate isotope of plutonium. This material, which may be refractory plutonium dioxide ($PuO_2$), that is $PuO_2$ ignited at temperatures greater than about 900° C., may be heated to a temperature of from about 1000° C. to about its melting temperature in an atmosphere in which the partial pressure of oxygen is maintained at less than about one micron. The purpose of this heating at elevated temperature in a reducing atmosphere is to reduce the plutonium dioxide to a lower oxide form, such as diplutonium trioxide, $Pu_2O_3$, with the evolution of oxygen. Thus at reduced oxygen pressure, the favored reaction is

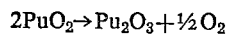

$$2PuO_2 \rightarrow Pu_2O_3 + \tfrac{1}{2}O_2$$

As shown in the drawing, the reduction of plutonium dioxide to a lower oxide may be enhanced and hastened by heating in the presence of an auxiliary reductant such as hydrogen gas, elemental carbon, lithium, plutonium metal, calcium and any other suitable reducing agent as used to reduce plutonium compounds to plutonium metal.

The material may be maintained at the elevated temperature in a vacuum or in a reducing atmosphere until conversion is generally effected. Complete stoichiometric conversion of, for example, $PuO_2$ to $Pu_2O_3$, is not required. Conversion to a stoichiometry of about $PuO_{1.8}$ (i.e., ratio of Pu atoms to oxygen atoms is 1:1.8) may significantly enhance dissolution. The time requirements for conversion may be readily calculated by one skilled in the art and are affected by such factors as type of atmosphere, amount and particle size of initial load, temperature, vacuum level, oxygen partial pressure, etc. When the conversion is generally complete, the product may be cooled at reduced pressure or in a nonoxidizing atmosphere to room temperature so as to prevent the lower oxide form from reoxidizing to plutonium dioxide. If desired, an inert gas atmosphere may be employed for the same purpose, i.e., to prevent reoxidation.

The reduced plutonium dioxide may then be contacted with or submerged in a suitable acid bath to effect dissolution at either room temperature or at an elevated temperature. Dissolution may be conducted at a temperature of from about ambient temperature, for example about 25° C., to about the boiling temperature of the acid bath at about 1 atmosphere pressure. At room temperature the dissolution step may require longer periods of time to achieve dissolution but increase safety and reduces corrosive and other effects resulting from heating. Submerging may be made by immersion, spraying, swabbing, contacting, application with brush, etc., and the term submerging as herein used includes such methods of contact as listed above. A preferred bath which may be employed may include about 15.4 M concentrated nitric acid ($HNO_3$) with from about 0.01 M to about 0.1 M hydrofluoric acid (HF). Other bath combinations which will also dissolve this lower oxide form product are from about 6 N to about 15 N nitric acid with about 0.01 M to about 0.1 M hydrofluoric acid added. As an alternative the bath may include only nitric acid within the above limits, but the hydrofluoric acid as recited above may be added to accelerate dissolution in relatively short time periods of from about ¼ to about 4 hours depending on quantities of materials being dissolved, amount of surface area exposed, temperature, agitation, and other factors normally considered by one of ordinary skill in the art. Dissolution may also be effected at greatly increased rates using the same baths or acid mixtures as are used in prior art processes.

Dissolution rates of specimens processed through this sequence have been compared with dissolution rates of plutonium dioxide which was heated in air to 1400° C.

and then cooled in air. Using the preferred nitrichydrofluoric acid bath recited above at room temperature, only 29% of the plutonium dioxide (1.86 grams of $PuO_2$) sample that was not converted to lower oxide form dissolved whereas 97% of the reduced plutonium dioxide (1.94 grams of $PuO_{1.8}$) sample dissolved within the same 24 hour period. Further, using the same bath, $PuO_{1.88}$, $PuO_{1.96}$, and $PuO_2$ samples have been soaked for about 16 hours and then the bath raised to boiling temperature for one hour. About 71% of the $PuO_{1.88}$ sample dissolved, about 50% of the $PuO_{1.96}$ sample dissolved and finally only between about 13% and about 15% of the untreated $PuO_2$ samples dissolved.

Refractory plutonium dioxide has been reduced to lower oxide form and subsequently dissolved in accordance with the process steps of this invention with good success. This dissolution has been carried out during analysis and recovery processes not only for fuels to be used in nuclear power systems, but also during recovery and purification of reactor fuels containing plutonium-238 dioxide or mixtures with other ceramic materials. Thus major problems existant before this invention in manufacturing processes in which plutonium dioxide is used have been significantly reduced. This includes time required for dissolution, safety hazards involved, damage to process equipment, impure products, etc.

What is claimed is:

1. A process for dissolving plutonium dioxide comprising heating plutonium dioxide in the presence of a reductant taken from the group consisting of hydrogen, carbon, calcium, plutonium metal, and lithium, at temperature of greater than about 1000° C. to reduce said plutonium dioxide, cooling the reduced plutonium dioxide formed thereby in a nonoxidizing atmosphere, and thereafter dissolving said reduced plutonium dioxide with an acid taken from the group consisting of about 15.4 molar concentrated nitric acid with about 0.01 molar to about 0.10 molar hydrofluoric acid, from about 6 N to about 15 N nitric acid with from about 0.01 molar to about 0.10 molar hydrofluoric acid, and about 15 molar concentrated nitric acid.

2. The process of claim 1 wherein said heating is at a temperature of from about 1400° C. to about 1900° C.

3. The process of claim 1 wherein said heating and said cooling is conducted at less than about one micron partial pressure of oxygen.

4. The process of claim 1 wherein said dissolution is conducted at ambient temperature.

5. The process of claim 1 wherein said dissolution is conducted at a temperature between about ambient temperature and about the boiling temperature of the acid.

References Cited

UNITED STATES PATENTS

| | | | |
|---|---|---|---|
| 3,208,817 | 9/1965 | Jenkins | 423—251 |
| 3,259,473 | 7/1966 | Hopkins | 423—251 |

OTHER REFERENCES

"Power Reacter Fuel Processing," Nuc. Sol. Abs., vol. 17, No. 23, Dec. 15, 1963, pp. 5263–4, Abs. No. 39178.

Crossley, "Dissolution of $PuO_2$ in Hcl at High Temperature and Pressure," Nuc. Sol. Abs., vol. 24, No. 6, March 1970, p. 911., No. 9266.

Chong et al., "Dissolution of High-Fired $PuO_2$," Nuc. Sol. Abs., vol. 23, No. 6, March 1969, p. 954, No. 9378.

Stahl et al., "Study of Uranium-Plutonium Monoxides," Nuc. Sol. Abs., vol. 19, No. 1, January 1965, p. 122, No. 909.

CARL D. QUARFORTH, Primary Examiner

R. L. TATE, Assistant Examiner

U.S. Cl. X.R.

423—251